United States Patent [19]

Lagergren et al.

[11] Patent Number: 4,798,092
[45] Date of Patent: Jan. 17, 1989

[54] FLOWMETER FOR USE IN A FLOW MONITORING SYSTEM

[75] Inventors: Peter J. Lagergren; David J. Roh, both of Arlington, Tex.

[73] Assignee: Pandel Instruments, Inc., Grand Prairie, Tex.

[21] Appl. No.: 55,176

[22] Filed: May 28, 1987

[51] Int. Cl.⁴ .............................................. G01F 1/12
[52] U.S. Cl. ............................... 73/861.77; 73/861.78
[58] Field of Search ............ 73/861.78, 861.77, 861.02, 73/861.03, 861.79, 861.81; 123/478; 364/510

[56] References Cited

U.S. PATENT DOCUMENTS

| | | | |
|---|---|---|---|
| 3,455,162 | 7/1969 | Michener et al. | 73/861.78 |
| 3,990,305 | 11/1976 | Wallman | 73/861.02 |
| 4,088,022 | 5/1978 | Kalotay | 73/861.78 |
| 4,418,673 | 12/1983 | Tominari et al. | 123/478 |
| 4,446,523 | 5/1984 | Reinke | 73/861.52 |
| 4,459,861 | 7/1984 | Hoffmann | 73/861.78 |
| 4,581,708 | 4/1986 | Van Ostrand et al. | 364/510 |
| 4,678,992 | 7/1987 | Hametta | 324/208 |

*Primary Examiner*—Michael J. Tokar
*Assistant Examiner*—Robert P. Bell
*Attorney, Agent, or Firm*—David H. Judson

[57] ABSTRACT

An improved flowmeter for measuring the flow rate of a fluid in a fluid path is described. In the preferred embodiment, the flowmeter includes a housing having a longitudinal bore therein. A turbine assembly is supported for rotation in the longitudinal bore and includes one or more conductive blades. An inductor coil is supported adjacent the longitudinal bore, and an oscillator is coupled to the inductor coil for generating a signal of predetermined RF frequency in the inductor coil to induce a magnetic field in the bore. In operation, when the fluid is directed through the longitudinal bore, the blades of the turbine assembly are rotated at a speed proportional to flow rate to generate a sensed signal in the inductor coil. The sensed signal includes a low frequency amplitude-modulated signal component proportional to the flow rate of the fluid. The sensed signal is filtered and then processed, using a microprocessor-based look-up table encoding technique, to generate instantaneous estimates of the flow rate. These estimates are then averaged and normalized to a predetermined temperature to produce the desired flow rate output.

7 Claims, 4 Drawing Sheets

FLOWMETER FOR USE IN A FLOW MONITORING SYSTEM

The present invention relates generally to fluid flow measurement and more particularly to an improved fluid flowmeter for generating highly accurate fluid flow and temperature data for use in a flow monitoring system.

BACKGROUND OF THE INVENTION

Fluid flow monitoring systems are well known in the prior art. Typically, such systems include a fluid flowmeter device interposed in a path of the fluid whose flow rate is desired to be measured. The flowmeter normally includes a flow transducer which generates an electrical signal proportional to the sensed flow rate. Although such flowmeter devices have proven generally effective, it is often difficult to produce an electrical signal proportional to flow rate which is both thermally and electrically-stable. Instability in the electrical signal generated by the flow transducer creates measurement errors which decrease the accuracy of the device. To overcome this problem, complex and costly processing circuitry must often be used to compensate for electrical signal variations caused by thermal and other factors.

There is therefore a need for an improved fluid flowmeter for use in a flow monitoring system which overcomes these and other problems of prior art devices.

BRIEF SUMMARY OF THE INVENTION

An improved flowmeter is described including a turbine assembly which cooperates with a high frequency oscillator to generate a highly accurate and stable electrical signal proportional to the measured flow rate of a fluid through the flowmeter. This electrical signal is filtered and then processed using a look-up table encoding technique to generate instantaneous estimates of the flow rate based on linearized values of flow rate generated during calibration of the device. The flow rate estimates are then averaged over a predetermined time period and corrected to a normalized temperature.

In the preferred embodiment, the flowmeter includes a housing having a longitudinal bore therein. The turbine assembly is supported for rotation in the longitudinal bore and includes one or more conductive blades. An inductor coil is supported adjacent the longitudinal bore, and an RF oscillator coupled to the inductor coil for generating a signal of predetermined RF frequency in the inductor coil to thereby induce a magnetic field in the bore surrounding the blades. When the blades are at rest, the signal in the inductor coil has a predetermined resonant frequency and amplitude. However, when the fluid is directed through the longitudinal bore, the blades of the turbine assembly are rotated to alter the resonant frequency and amplitude of the signal in the inductor coil. In particular, the resulting signal has a relatively low frequency amplitude-modulated signal component whose frequency is proportional to the speed of the blades and thus the flow rate of the fluid. The "sensed" signal is filtered to remove the high frequency RF signal component, and the resulting amplitude-modulated signal component is then shaped and amplified to produce a pulse signal having a plurality of pulses.

According to another feature of the invention, the pulse width of each pulse in the pulse signal is used as a pointer to one of a plurality of addressable storage locations in a look-up table. Each of the storage locations includes a predetermined flow rate value equal to a predetermined number of pulses per unit volume at a given flow rate of the fluid. These flow rate values are preset during calibration of the flowmeter. Specifically, a known volume of fluid is passed through the fluid system at a plurality of known flow rates. For each such flow rate, a pulse signal having a predetermined number of pulses per unit volume is generated in the manner previously described. These pulse values are then stored in the look-up table at predetermined addresses. The remainder of the values in the look-up table are generated by linearly-extrapolating between the predetermined flow rate values generated during the calibration process.

To measure an unknown flow rate, a digital processing circuit of the flowmeter receives a pulse signal representing the unknown flow rate and in response thereto determined the pulse width of each pulse therein. The digital processing circuit is responsive to each pulse width determination for selecting one of the plurality of addressable storage locations in the look-up table. The predetermined flow rate value is then retrieved from the selected addressable storage location to form an estimate of the flow rate for the given pulse used as the pointer to the look-up table. Successive flow rate estimates are then averaged over a predetermined time period to generate a flow rate signal. The flow rate signal is then corrected to a normalized temperature and output from the device.

In the preferred embodiment, the flowmeter is incorporated in an engine fuel monitoring system having a suitable monitor device. The monitor device includes a keyboard for entering control information, and a display for displaying the sensed flow rate as well as fuel consumption and temperature information. The fuel monitoring system also preferably includes an accumulator located between the flowmeter and the engine for dampening or removing pressure pulses in the fuel line. If the engine fuel system has both supply and return lines between a fuel tank of the system and the engine, a flowmeter of the type described above is used in each line.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
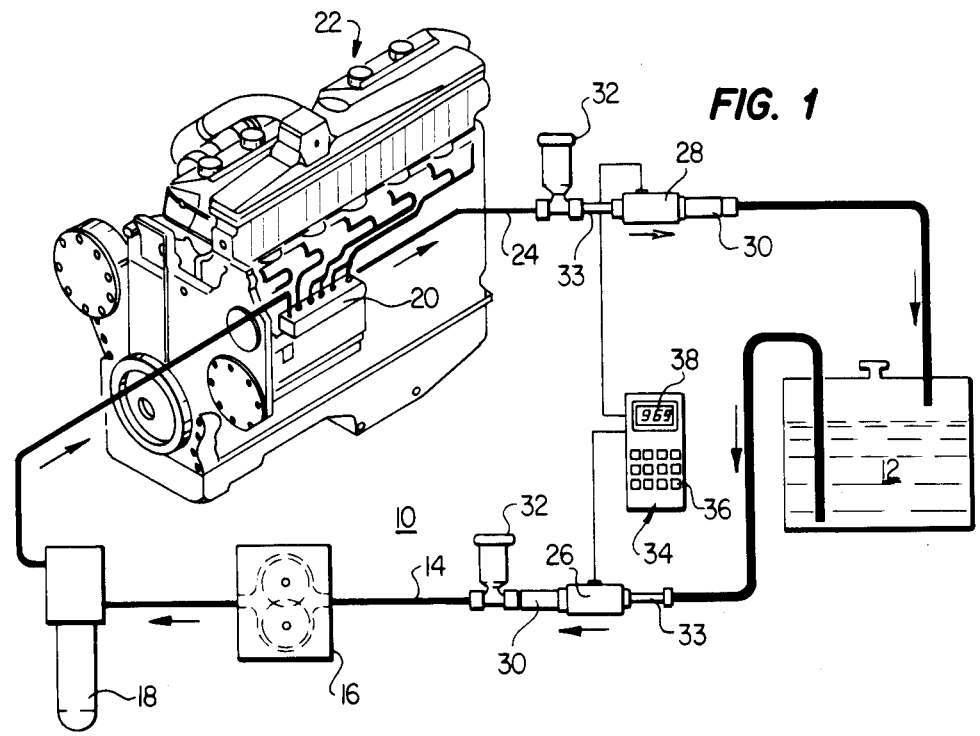
FIG. 1 is a schematic diagram of a flow monitoring system according to the invention for use in a conventional closed loop engine fuel system having supply and return lines between an engine and a fuel tank thereof.

With references to the FIGURES wherein like reference characters designate like or similar parts throughout the several views, FIG. 1 is a schematic diagram of a flow monitoring system according to the invention for use in a conventional diesel engine fuel system 10. The flow monitoring system of the invention is not limited for use in diesel or other automobile fuel systems, and the reference to such a fuel system is merely exemplary. Fuel system 10 includes a conventional fuel tank 12 which normally delivers fuel via a supply line 14 to a fuel transfer pump 16. The output of the fuel transfer pump 16 is filtered by a fuel filter 18 of the fuel system and then delivered to a fuel injection pump 20 at the engine 22. In the diesel fuel system, unburned fuel is normally returned to the fuel tank via return line 24 to form a closed loop system.

According to the invention, a flow monitoring system is incorporated into the fuel system 10 to measure and display fuel flow rate information, as well as total fuel consumption and temperature information. To this end, the flow monitoring system includes a flowmeter 26 preferably located in the supply line 14 between the fuel tank 12 and the fuel transfer pump 16. Likewise, the flow monitoring system includes a flowmeter 28 located in the return line 24. Each of the flowmeters 26 and 28 includes an associated sight glass 30 connected to the output thereof for checking for the presence of air in the fuel path, and an accumulator 32 for dampening any pressure pulses which may be present in the fuel supply and return lines. As seen in FIG. 1, each accumulator 32 is connected at the end of the respective flowmeter closest to the fuel injection pump 20. Each flowmeter 26 and 28 also preferably includes a flow straightener 33 connected to the input thereof.

The flow monitoring system includes a flow monitor device 34 connected to the flowmeters 26 and 28. The flow monitor device 34 includes a suitable keyboard 36 (or other control switches) for entering information to the fuel monitoring system, and a suitable liquid crystal display (LCD) 38, or the like, for displaying monitored information. Of course, the two flowmeter system of FIG. 1 is not required when the engine or other fluid delivery system does not include a fuel return line. In such case, only the single flowmeter 26 is incorporated in the supply line 14.

Figure 2:
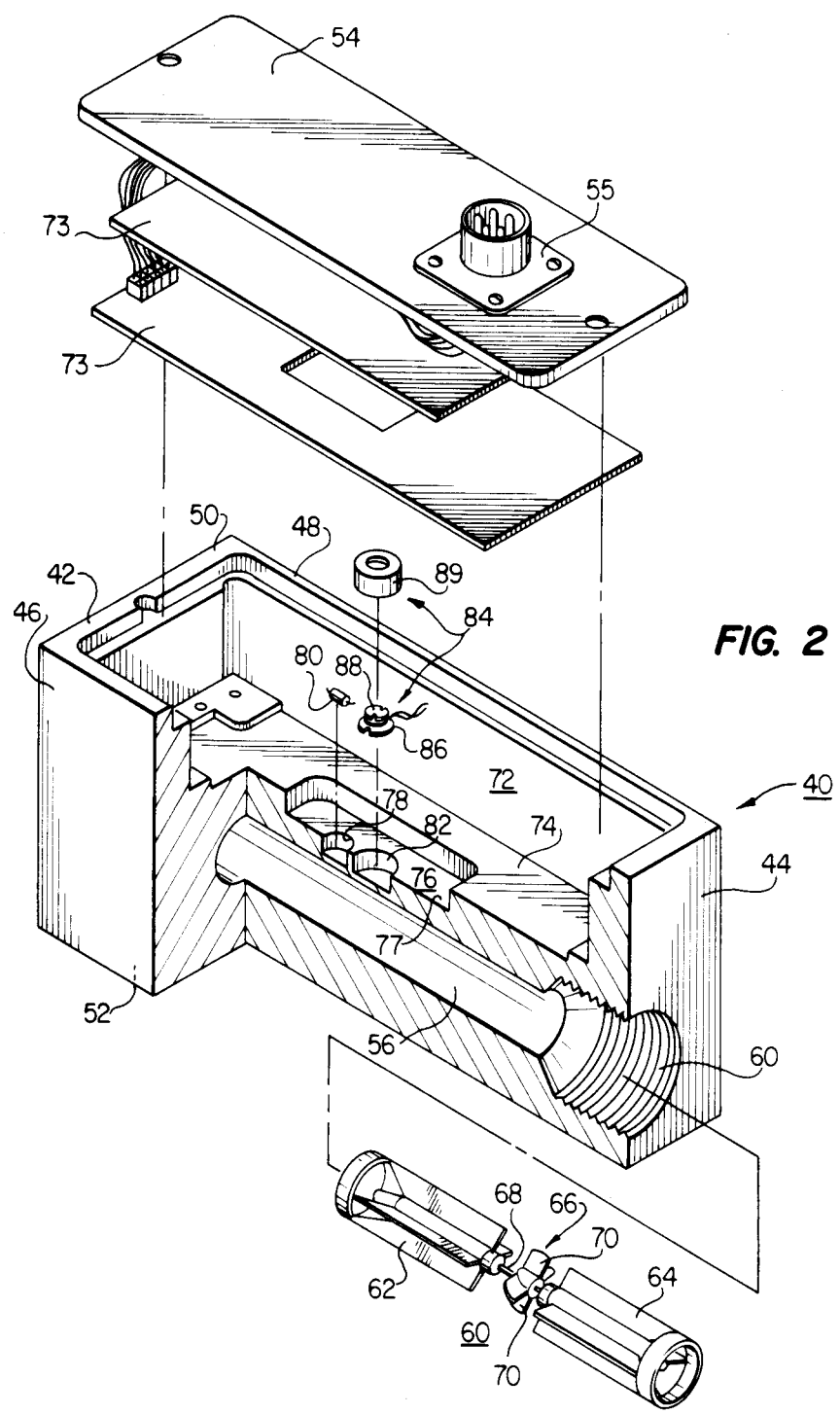
FIG. 2 is an exploded perspective view of an improved fluid flowmeter of the present invention.

Referring now to FIG. 2, an exploded perspective view is shown of one of the flowmeters of the flow monitoring system of FIG. 1. As will be described in more detail below, the flowmeter of the present invention advantageously includes all of the supporting electronic control circuitry in the device itself. In particular, each flowmeter includes a housing 40 having first and second end portions 42 and 44, first and second side portions 46 and and 48, and top and bottom portions 50 and 52. The top portion 50 of the housing 40 supports a removable cover 54 for enabling access to the interior of the housing 40 as will be described. Removable cover 54 supports an electrical connector 55 for connecting electrical signals to and from the device.

The housing 40 includes a longitudinal bore 56 formed therein between first and second female threaded connectors, one of which is shown by reference numeral 60. The longitudinal bore 56 is designed to be interposed in the fuel line for receiving the fluid flow between the first and second end portions 42 and 44 of the housing 40. The longitudinal bore 56 supports a turbine assembly 60 comprising a first straightener member 62, a second straightener member 64 and a blade member 66 located between the first and second straightener members. The first and second straightener members 62 and 64 support a spindle 68 on which the blade member 66 rotates as the fluid whose flow rate is to be measured is directed through the longitudinal bore 56. As will be described in more detail below, the blade member 66 includes one or more arcuate-shaped conductive blades 70 made of ferromagnetic or like material. The speed at which the blades of the turbine assembly 60 rotate on the spindle 68 is proportional to the rate of fluid flow through the longitudinal bore 56.

The housing 40 includes a first recess 72 in an upper portion thereof for supporting a plurality of circuit boards 73. The circuit boards 73 support an electronic control circuit, to be described in more detail below, for controlling the operation of the flowmeter. The bottom surface 74 of recess 72 includes a recess 76 also having a bottom surface 77. Bottom surface 77 of recess 76 includes a first recess 78 for supporting a temperature sensor 80 therein, and a second recess 82 for supporting a coil assembly 84 therein. Coil assembly 84 comprises an inductor coil 86 supported on a suitable bobbin 88 within a coil form 89. The recess 76 provides easy access to the temperature sensor 80 and the coil assembly 84 for removal and replacement thereof if necessary. As seen in FIG. 2, the inductor coil 86 of the coil assembly 84 is supported adjacent to the longitudinal bore 56 for the purpose of inducing a magnetic field therein. As described above, when a fluid is directed through the longitudinal bore 56 between the end portions 42 and 44 of the flowmeter, the blades 70 of the blade member 66 of the turbine assembly 60 are rotated at a speed proportional to the flow rate of the fluid through the flowmeter. Rotation of the conductive blades 70 through the magnetic field generated by the inductor coil 86 causes both frequency and amplitude deviations in the electrical signal flowing in the inductor coil 86 as will be described below. These frequency and amplitude fluctuations are sensed to determine the flow rate.

Figure 3:
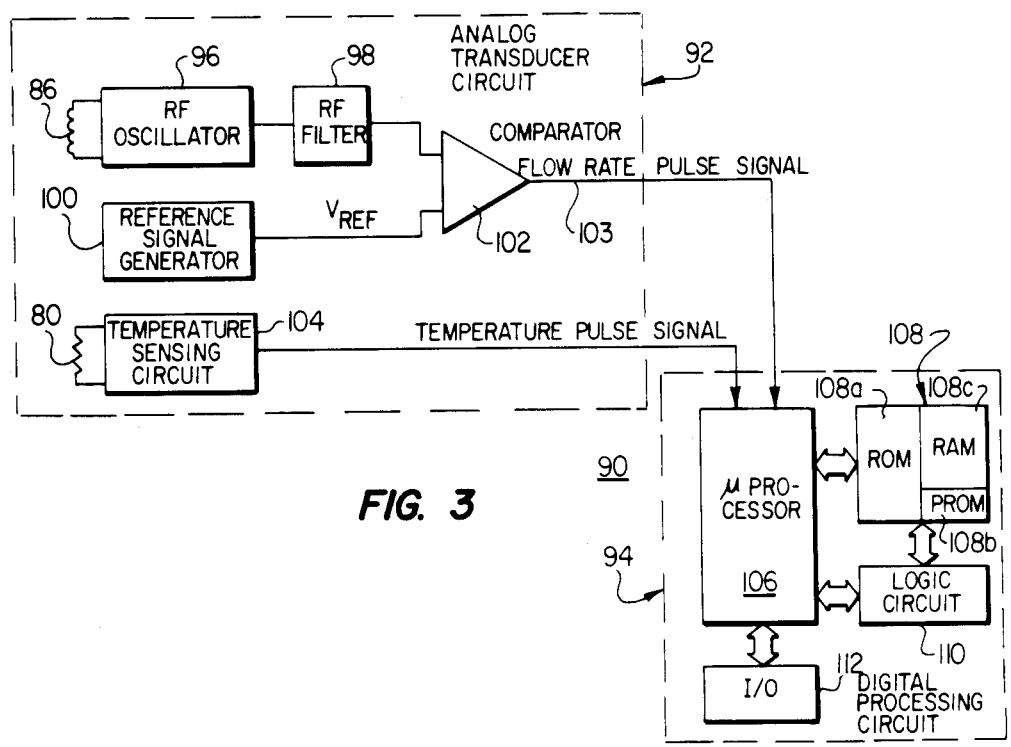
FIG. 3 is a simplified block diagram of an electronic control circuit supported in the housing of the flowmeter of FIG. 2.

Referring now to FIG. 3, a simplified block diagram is shown of an electronic control circuit 90 for use in measuring the flow rate of the fluid in the flowmeter of FIG. 2. As described above, all of the necessary components of the electronic control circuit 90 are supported on circuit boards 73 supported in the recess 72 of the housing 40. The electronic control circuit 90 includes two basic functional sections, an analog transducer circuit 92 and a digital processing circuit 94. Analog transducer circuit 92 includes an RF oscillator 96 connected to inductor coil 86, an RF filter 98, a reference signal generator 100, a comparator 102 and a temperature sensing circuit 104. Digital processing circuit 94 includes a programmable microprocessor 106, associated memory devices 108 for storing suitable control programs and data for use by the microprocessor 106, a control logic circuit 110 for controlling the microprocessor 106, and an input/output circuit 112 for interfacing the electronic control circuit 90 to the flow monitor device 34 of FIG. 1. The memory devices 108 include a read only memory 108a (ROM) for storing control programs, a programmable read only memory (PROM) 108b for storing a look-up table to be described, and a random access memory (RAM) 108c for storing data being processed by the microprocessor 106. Though not shown in detail in FIG. 3, the electronic control circuit 90 also includes a suitable voltage regulator device. External power to the electronic control circuit 90 is provided via the electrical connector 55 from the flow monitor device 34 of FIG. 1 or some other external power supply, e.g. an automobile battery.

Referring now simultanously to FIGS. 2 and 3, the operation of the electronic control circuit 90 will be described. In particular, the RF oscillator 96 is connected to the inductor coil 86 of the coil assembly 84 for generating a signal of predetermined RF frequency in the inductor coil 86. The oscillations in the inductor coil 86 induce a magnetic field in the longitudinal bore 56 supported adjacent thereto. The oscillations in the inductor coil 86 are at a predetermined amplitude and resonant frequency when the conductive blades 70 are at rest, i.e., when no fluid is flowing through the flowmeter. However, when a fluid is directed through the longitudinal bore 56, the blade member 66 is rotated, thereby causing the conductive blades 70 66 to rotate through the magnetic field induced in the longitudinal bore 56 by the inductor coil 86. Movement of the conductive blades 70 through the induced magnetic field changes the resonant frequency of the RF oscillator 96 and generates a low frequency amplitude modulation component on the resulting "sensed" RF signal flowing through the inductor coil 86. The generation of a low frequency amplitude-modulated signal component on the sensed signal in the inductor coil 86 insures that frequency instabilities of the RF oscillator 96 do not produce any measuring inaccuracies in the flowmeter output. This significantly increases the accuracy of the sensed flow rate measurement, thereby providing improved operation over prior art devices.

The sensed signal in the inductor coil 86 is applied to the RF filter 98 for the purpose of extracting the low frequency amplitude-modulated signal component from the high frequency (i.e., RF) signal. Accordingly, the RF filter 98 operates to effectively extract the envelope of the signal applied thereto. The output of the RF filter 98 is supplied as one input to the comparator 102, with the other input thereto being a reference signal supplied by the reference signal generator 100. The comparator 102 compares the reference signal and the amplitude-modulated signal component, and in response thereto generates a shaped and amplified pulse signal at the output 103 thereof. As will be described in more detail below, the pulse signal includes a plurality of pulses each having a pulse width proportional to instantaneous flow rate of the fluid. The analog transducer circuit 92 also generates a control signal proportional to the ambient temperature in the longitudinal bore 56. In particular, the temperature sensing circuit 104 includes the temperature sensor 80 which generates an output current proportional to temperature variations. This output current is converted, using a current-to-frequency circuit in the temperature sensing circuit 104, to a pulse signal having a pulse rate proportional to temperature variations. The pulse signals output from the comparator 102 and the temperature sensing circuit 104 are then supplied to the digital processing circuit 94 for subsequent processing.

According to a feature of the invention, the programmable read only memory (PROM) 108b of the digital processing circuit 94 includes a look-up table having a plurality of addressable storage locations therein. Each of the plurality of addressable storage locations in the look-up table stores a predetermined flow rate value equal to a predetermined number of pulses per unit volume at a given flow rate of the fluid. These flow rate values are preset during calibration of the flowmeter for the specific fluid system being monitored. In particular, a known volume of fluid is passed through the flowmeter at a plurality (e.g., twenty (20)) of known flow rates during the calibration process. For each such flow rate, the analog transducer circuit 92 generates a pulse signal at the comparator output 103 having a predetermined number of pulses per unit volume. These pulse values are stored in the look-up table in the PROM 108b at predetermined locations. The address of each location is preferably equal to the number of clock cycles during the pulse width (of the pulse signal) corresponding to the known flow rate. Intermediate flow rate (and address) values are generated by a control program in the ROM 108a which linearly-extrapolates between the measured pulse values for the plurality of known flow rates to generate such intermediate values. Therefore, the look-up table thus stores a plurality of linearized values of flow rate for the fluid delivery system.

To measure an unknown flow rate, the microprocessor 106 of the digital processing circuit 94 receives the pulse signal generated from the sensed signal which, as described above, includes a plurality of pulses each having a pulse width proportional to instantaneous flow rate. The control program in the ROM 108a controls the microprocessor 106 to determine the pulse width of each pulse input to the microprocessor 106 by establishing a pulse width count equal to a number of counts (clock cycles) for each pulse. In response thereto, the control program selects one of the plurality of the addressable storage locations in the look-up table. Therefore, as noted above the pulse width of each pulse in the pulse signal output from the comparator 102 is used as a pointer to one of the plurality of addressable storage locations in the look-up table stored in PROM 108b. The control program then retrieves the predetermined flow rate value from the selected addressable storage location to form an estimate of the flow rate for the given pulse used as the pointer to the look-up table.

According to the invention, successive flow rate estimates for each of the pulses in the pulse signal output from the comparator 102 are then averaged by the control program over a predetermined time period (e.g., 1 second) to generate a flow rate signal. The flow rate signal is then normalized by the control program to a predetermined temperature (e.g., 60° F.) using the pulse signal supplied from the temperature sensing circuit 104. The adjusted flow rate signal is output from the microprocessor 106 to the I/O circuit 112 for use by the flow monitor device 34 as described above with respect to FIG. 1.

According to the present invention, an improved flowmeter includes an RF oscillator for establishing oscillations in an inductor coil adjacent to the fluid path. These oscillations create a magnetic field in the path. Conductive blades of a turbine assembly are rotated by the fluid in the path with little or no resistance. These blades interrupt the magnetic field and thus change the resonant frequency of the oscillations in the inductor coil. The passage of the blades through the field also creates a low frequency amplitude-modulation on the signal in the inductor coil. This signal is filtered and then processed using a microprocessor-based look-up table encoding technique to generate instantaneous estimates of the flow rate based on linearized values of flow rate generated during calibration of the device. The flow rate estimates are then averaged over a predetermined time period and normalized to a given temperature to generate an indication of flow rate.

The flowmeter of the present invention is advantageous because the use of ferro-magnetic conductive blades 70 in the turbine assembly 60 in conjunction with the RF oscillator insures that the inductor coil current remains thermally and inductively stable and that the flow rate information is encoded in a low frequency amplitude-modulated component thereof. Accordingly, any frequency drift in the oscillator due to temperature or other environmental variations does not create measuring inaccuracies in the resulting flow rate calculation.

Figure 4A:
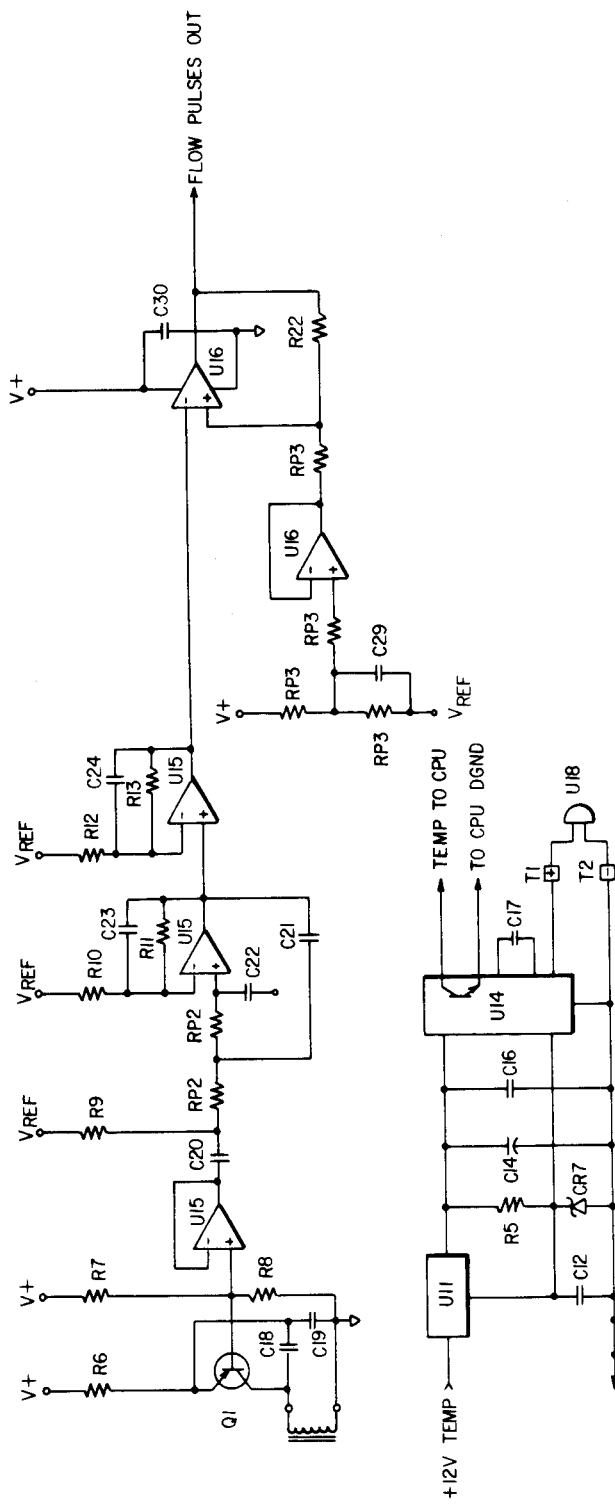
FIGS. 4A–4B are detailed schematic diagrams of the analog transducer circuit and the digital processing circuit, respectively, of the electronic control circuit of FIG. 3.
Figure 4A:
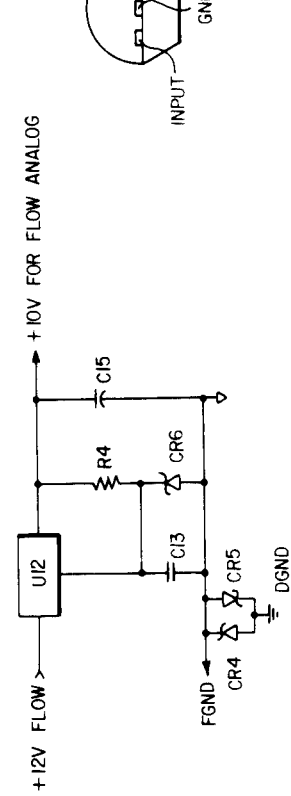
Figure 4B:
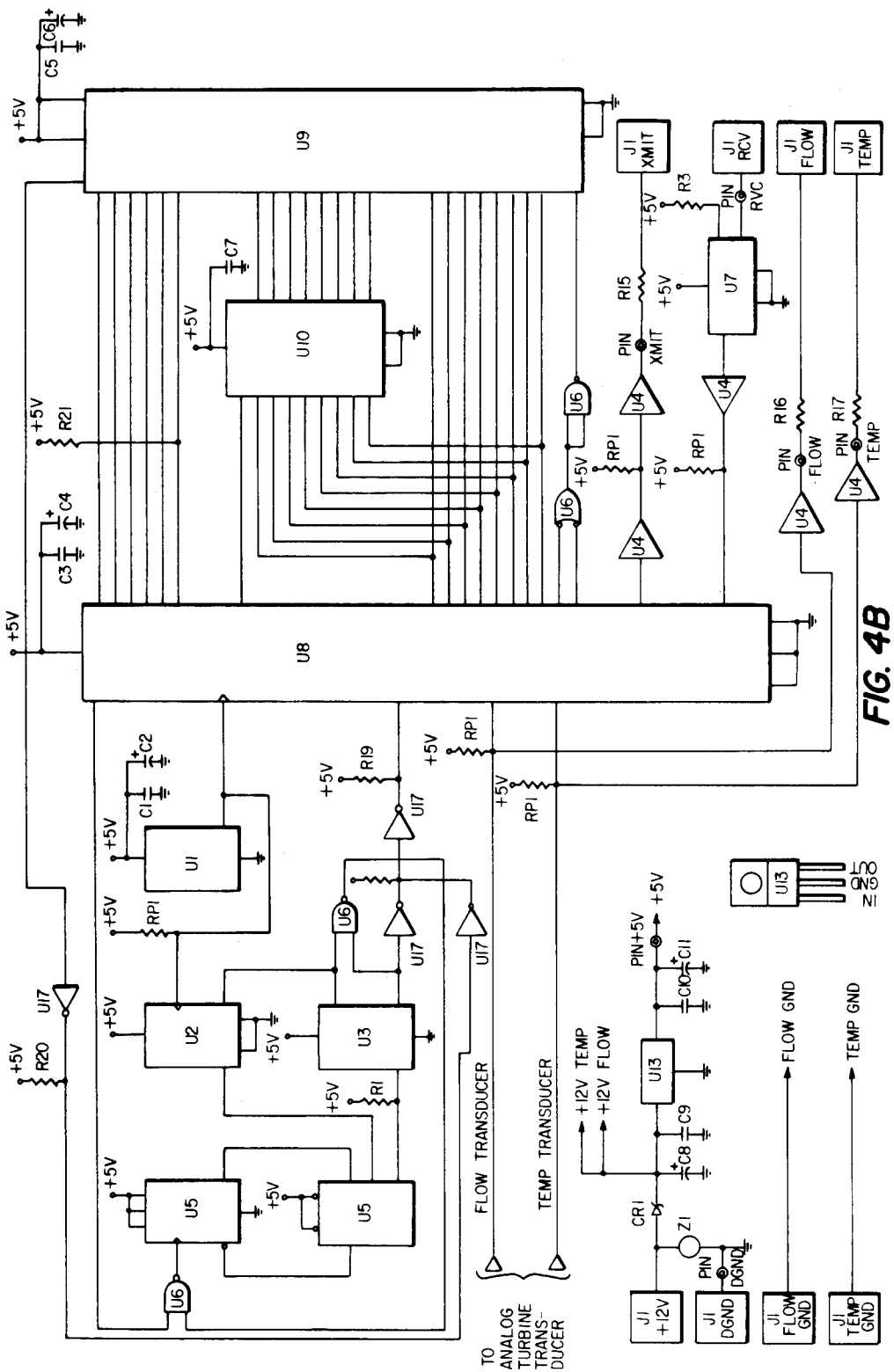

Referring now to FIGS. 4A–4B, detailed schematic diagrams of the electronic control circuit 90 are shown. In particular, FIG. 4A is a schematic diagram of the analog transducer circuit 92, and FIG. 4B is a schematic diagram of the digital processing circuit 94. Additionally, set forth below is a code listing of a control program for storage in the ROM 108a of the digital processing circuit 94 for use in controlling the microprocessor 106 to carry out the operations described hereinabove.

```
; FLOW METER PROGRAM WITH FLOW EIGHT SECOND MOVING AVERAGE
; REV: ORG

;**************************************************************
;
;       SYSTEM NOTES
;
;**************************************************************
;
; 1.  DATA WILL BE TRANSMITTED TO THE MAIN CPU IN THE FOLLOWING ORDE
;         SERIALL        LOW BYTE OF FLOW METER SERIAL NUMBER
;         SERIALH        HIGH BYTE OF FLOW METER SERIAL NUMBER
;         STATUS         FLOW METER STATUS BYTE
;         TFEDGL         LOW BYTE OF NUMBER OF FLOW EDGES DETECTED
;         TFEDGH         HIGH BYTE OF NUMBER OF FLOW EDGES DETECTED
;         TFLOWL         LOW BYTE OF FLOW RATE
;         TFLOWH         HIGH BYTE OF FLOW RATE
;         TTEMP          TEMPERATURE

; 2.  GPH = (3600*F)/K
;
; 3.  BAD MEMORY ON REV 'E' AT 49,4B,4C,4D,4F HEX.

;**************************************************************
;
;       PORT ONE USAGE
;
;**************************************************************
;
; P1.7 = HIGH DURING PULSE CALCULATION TIME.  (.21 MILSEC PER PULSE:
; P1.6 = HIGH DURING PERIOD CALCULATIONS.  ( 3.9 MILSEC PER PERIOD:
; P1.5 = WATCH DOG RESET. 3.255 USEC STROBE i.e. TWO INSTRUCTIONS
; P1.4 = HIGH DURING DATA TRANSMISSION. (23.34 MILSEC PER PERIOD)
; P1.3 = INIT: WILL ALTERNATE
; P1.2 = TIMER 0 (ALTERNATE EVERY CYCLE)
; P1.1 = TIMER 0 (ALTERNATE EVERY SECOND)
; P1.0 = SINGLE STEP

;**************************************************************
;
;       CAT BOARD UART SET UP
;
;**************************************************************

; BAUD = 9600
; DATA BITS = 7
; BIT 8 = 1
; PARITY = NONE
; STOP BITS = 2
;
;************* 2681 SET UP  ************************************
;
; 2 PB C!
; 15 200A C!     ;CRB

;**************************************************************
;
;       BYTE SYMBOLS
;
;**************************************************************

CR      EQU     0DH     ;CARRIAGE RETURN
LF      EQU     0AH     ;LINE FEED
ESC     EQU     1BH     ;ESCAPE
```

```
CLRS      EQU     1AH         ;CLEAR SCREEN
HOME      EQU     1EH         ;CURSOR HOME
PCOD      EQU     87H         ;8031 PCON REGISTER
SHORTL    EQU     00          ;LOW BYTE OF SHORT CYCLE TIMER VALUE
SHORTH    EQU     0A0H        ;HIGH BYTE OF SHORT CYCLE TIMER VALUE

;************************************************************
;
;*      BIT SYMBOLS
;
;************************************************************

ORG     00H
;STATUS BYTE TO BE TRANSMITTED
SPDF      DB      0           ;SET WHEN FREQ IS TOO HIGH TO COMPLETE CAL
TSTA1     DB      0           ;NOT USED
TSTA2     DB      0           ;NOT USED
STACKF    DB      0           ;STACK OVER RUN ERROR
WRESETF   DB      0           ;WATCH DOG RESET FLAG
HSPDF     DB      0           ;HIGH SPEED ERROR FLAG
OFLOWF    DB      0           ;OVER FLOW ERROR FLAG
NEWVALF   DB      0           ;NEW VALUE FLAG. RESET AFTER FIRST TRANSMI

;NEXT BYTE
SECF      DB      0           ;SET AT START OF EACH ONE SECOND PERIOD
                              ;RESET AFTER PERIOD CALCULATIONS
PERF      DB      0           ;PERIOD FLAG TO START CALCULATION
                              ;RESET RIGHT AFTER CALCULATIONS START
NEGF      DB      0           ;TEMPERATURE DELTA CORRECTION SIGN
;************************************************************
;
;       VARIABLES
;
;************************************************************

ORG     00
FLOWLO    DB      0
FLOWHO    DB      0

ORG     20H
SFEDGL    DB      0           ;LOW BYTE OF NUMBER OF FLOW EDGES
SFEDGH    DB      0           ;HIGH BYTE OF NUMBER OF FLOW EDGES
SFLOWL    DB      0           ;LOW BYTE OF FLOW RATE
SFLOWM    DB      0           ;MIDDLE BYTE OF FLOW RATE
SFLOWH    DB      0           ;HIGH BYTE OF FLOW RATE
STEDGL    DB      0           ;LOW BYTE OF NUMBER OF TEMPERATURE EDGES
STEDGH    DB      0           ;HIGH BYTE OF NUMBER OF TEMPERATURE EDGES
STEMP     DB      0           ;TEMPERATURE, DEGREES CENTIGRADE
STESTL    DB      0           ;DEBUG
STESTH    DB      0           ;DEBUG

;************* DATA WAITING TO BE TRANSMITTED *************

XSTAT     DB      0           ;XMIT STATUS
XFEDGL    DB      0           ;LOW BYTE OF NUMBER OF FLOW EDGES
XFEDGH    DB      0           ;HIGH BYTE OF NUMBER OF FLOW EDGES
XFLOWL    DB      0           ;LOW BYTE OF FLOW RATE
XFLOWM    DB      0           ;MIDDLE BYTE OF FLOW RATE
XFLOWH    DB      0           ;HIGH BYTE OF FLOW RATE
XTEMP     DB      0           ;TEMPERATURE

;************* NON TRANSMITTED VARIABLES *************

MULCTR    DB      0           ;BIT COUNTER FOR MULTIPLY ROUTINE
TEMPL     DB      0           ;LOW BYTE OF TEMPERATURE
TEMPH     DB      0           ;HIGH BYTE OF TEMPERATURE
PWL       DB      0           ;LOW BYTE OF FLOW PULSE WIDTH

ORG     40H

PWH       DB      0           ;HIGH BYTE OF FLOW PULSE WIDTH
FRCTR     DB      0           ;FRAME COUNTER
```

```
TEDGL    DB          0          ;TEMPERATURE EDGE COUNTER LOW BYTE
TEDGH    DB          0          ;TEMPERATURE EDGE COUNTER HIGH BYTE

ORG         23H

FEDGL    DB          0          ;LOW BYTE OF FLOW EDGE COUNTER
FEDGH    DB          0          ;HIGH BYTE OF FLOW EDGE COUNTER
SUM4     DB          0          ;PULSE WIDTH COUNT TOTAL PER PERIOD
SUM3     DB          0
SUM2     DB          0
SUM1     DB          0
SUM0     DB          0
OLDH     DB          0
OLDL     DB          0
TMUL4    DB          0
TMUL5    DB          0
TMUL3    DB          0

ORG         44H
                                ;LOW BYTE OF CURRENT EXTENDED K
KH       DB          0          ;HIGH BYTE OB CURRENT EXTENDED "K"

ORG         50H

BITC     DB          0          ;DIVIDE BIT COUNTER
TEST0    DB          0          ;DIVIDE TEMPORAY STORAGE
TEST1    DB          0          ;  "
TEST2    DB          0          ;  "
TEST3    DB          0          ;  "
TEST4    DB          0          ;  "
TEST5    DB          0          ;       "
PART0    DB          0          ;PARTIAL DIVIDEND
PART1    DB          0          ;  "
PART2    DB          0          ;  "
PART3    DB          0          ;  "
PART4    DB          0          ;  "
PART5    DB          0          ;       "
MULR0    DB          0          ;RESULTS OF MULTIPLICATION
MULR1    DB          0          ;  "
MULR2    DB          0          ;  "
MULR3    DB          0          ;  "
QUOT0    DB          0          ;QUOTIENT FOR FIRST DIVIDE
QUOT1    DB          0          ;  "
QUOT2    DB          0          ;  "
QUOT3    DB          0          ;  "
QUOT4    DB          0          ;  "
TEN0                 DB    0         ;QUOTIENT FOR SECOND DIVIDE
TEN1                 DB    0         ;  "
TEN2                 DB    0         ;  "
TEN3                 DB    0         ;  "
TEN4                 DB    0         ;  "
XTESTL   DB          0          ;
XTESTH   DB          0
FRCTRT   DB          0
FRAMET   DB          0
FLOWH0   DB          0
FLOWL1   DB          0
FLOWM1   DB          0
FLOWH1   DB          0
FLOWL2   DB          0
FLOWM2   DB          0
FLOWH2   DB          0
FLOWL3   DB          0
FLOWM3   DB          0
FLOWH3   DB          0
FLOWL4   DB          0
FLOWM4   DB          0
FLOWH4   DB          0
TMUL0    DB          0
TMUL1    DB          0
TMUL2    DB          0
DUMMY    DB          0          ;DUMMY TO ALIGN STACK AND TEMP STORAGE
```

```
        ORG     0A003H
        LJMP    INT00

;***************************************************************
;
;       TIMER ZERO VECTOR
;
;***************************************************************
        ORG     0A00BH
        LJMP    TIME0

;***************************************************************
;
;       INTERRUPT ONE VECTOR
;
;***************************************************************
        ORG     0A013H
        JMP     INT11   ;TO TEMP EDGE COUNTER

;***************************************************************
;
;       TIMER ONE VECTOR
;
;***************************************************************
        ORG     0A01BH
        RETI

;***************************************************************
;
;       SERIAL INTERRUPT VECTOR
;
;***************************************************************
        ORG     0A023H
SERIN:
        PUSH    PSW
        PUSH    ACC
        SETB    P1.4

MOV     A,SBUF
        CLR     RI              ;CLEAR RECEIVER INTERRUPT
        CLR     C
        CJNE    A,#107,NEXT
        JMP     SL00
        MOV     A,#107          ;SERIAL NUMBER LOW BYTE
        CALL    SOUT
;
        CALL    DELAY
        MOV     A,#0            ;SERIAL NUMBER HIGH BYTE
        CALL    SOUT
;
; RESET WATCH DOG TIMER
;
        CLR     P1.5
        NOP
        NOP
        NOP
        NOP
        NOP
        SETB    P1.5
;
        CALL    DELAY
        MOV     A,XSTAT         ;XMIT STATUS
        CALL    SOUT
;
        CALL    DELAY
        MOV     A,XFEDGL
        CALL    SOUT
;
```

```
        CALL    DELAY
        MOV     A,XFEDGH
        CALL    SOUT
        ;
        CALL    DELAY
        MOV     A,XFLOWL
        CALL    SOUT
        ;
        CALL    DELAY
        MOV     A,XFLOWM
        CALL    SOUT
        ;
        CALL    DELAY
        MOV     A,XFLOWH
        CALL    SOUT
        ;
        CALL    DELAY
        MOV     A,XTEMP
        CALL    SOUT
        ;
        CALL    DELAY
        MOV     A,XTESTL
        CALL    SOUT
        ;
        CALL    DELAY
        CLR     P1.4
        POP     ACC
        POP     PSW
        RETI

;************************************************************
;
;       INTERRUPT ONE ) USED FOR TEMPERATURE INPUT
;
;************************************************************

INT11:
        SETB    P3.4
        PUSH    PSW
        PUSH    ACC

;ADD ONE TO TEMPERATURE EDGE COUNT ) TEDGL AND TEDGH

MOV     A,TEDGL
        ADD     A,#1
        MOV     TEDGL,A
        CLR     A
        ADDC    A,TEDGH
        MOV     TEDGH,A
        POP     ACC
        POP     PSW
        CLR     P3.4
        RETI

;************************************************************
;
;       SUBROUTINES
;
;************************************************************

;************************************************************
;
;       ASCII SERIAL OUTPUT
;       EVEN PARITY, 19,200 BAUD, ONE START, ONE STOP, 8 DATA BITS
;
;************************************************************

SOUT:

;************  CONFIGURE SERIAL PORT  ************

PUSH    PSW
        CLR     TI
```

```
;********* OUTPUT DATA *****************
        MOV     SBUF,A
;
;       TIME DELAY
;
;***************************************************************
DELAY:
        NOP
        PUSH    PSW
        CLR     RS1
        CLR     RS0
        NOP                     ;FOR "RET" TESTING
        MOV     R3,02
DELAYL:
        MOV     R2,00FEH
        DJNZ    R2,$
        NOP
        DJNZ    R3,DELAYL
        POP     PSW
        RET

;***************************************************************
;
;       MAIN
;
;***************************************************************
        ORG     0A900H
INIT:
        XRL     P1,008H

CLR     P1.0
        SETB    P1.0
        CLR     RS1             ;SELECT BANK ZERO
        CLR     RS0             ;SELECT BANK ZERO
        MOV     SP,02FH
        MOV     STATUS,00
        MOV     FRAME,00AH      ;SET UP ONE SECOND TIMER
        MOV     FRCTR,00
        MOV     PCON,00
        MOV     TCON,00         ;DISABLE ALL TIMERS AND INTERRUPTS
        MOV     IE,00           ;DISABLE INTERRUPTS
MAIN:

;LOAD TIMER MODES
        MOV     TMOD,021H
        SETB    TR0             ;START TIMER 0
        SETB    TR1             ;START TIMER 1
        SETB    IT1             ;INTERRUPT 1 ON FALLING EDGE
        SETB    IT0             ;INTERRUPT ZERO ON FALLING EDGE
        ;SET UP INTERRUPT PRIORITIES
        SETB    EX0             ;ENABLE INT0 FOR FLOW INPUT

;SET UP UART
        CLR     RI
        MOV     SCON,0OF8H
        MOV     TH1,00FFH
        SETB    TR1

CLR     TI

;RESET WATCH DOG TIMER

CLR     P1.5
        NOP
        NOP
        NOP
        NOP
        SETB    P1.5
```

MAINL:

PERCALC:

JNB      PERF,MAINL

;**********************************************************
;
;       START PERIOD CALCULATIONS ,
;
;**********************************************************

CLR      PERF

;SET P1.6 FOR START PERIOD CALCULATIONS SIGNAL

ORL      P1,#040H

;**********************************************************
;
;       START TEMPERATURE CALCULATIONS
;
;**********************************************************

;DO TEMPERATURE CALCULATIONS. THE TEMP SENSOR'S OUTPUT
       ;IS 2 HZ/DEGREE KELVIN, WHICH IS (NUMBER OF NEGATIVE
       ;EDGES)/DEGREES KELVIN.  BY SUBTRACTING 546 FROM THE NUMBER
       ;OF TEMPERATURE EDGES DETECTED, THE INPUT IS CONVERTED
       ;TO A CENTIGRADE VALUE.
       ;SUBTRACT 273 DECIMAL FROM RAW TEMP
       ;i.e. 546 DECIMAL SINCE TEMP IS IN .5 DEGREE INCREMENTS

```
        CLR     C
        MOV     A,STEDGL
        SUBB    A,#22H
        MOV     STEDGL,A
;
        MOV     A,STEDGH
        SUBB    A,#2
        MOV     STEDGH,A
        MOV     DPTR,#TTABP
        MOV     A,STEDGL
        MOVC    A,@A+DPTR

MOV     STEMP,A         ;STORE TEMP READY TO MOVE TO TRANS

;IS TEMP NEGATIVE ?

MOV     A,STEDGH
        JNB     ACC.0,TTPOS

;TEMP IS NEGATIVE

MOV     A,#0
        MOVC    A,@A+DPTR
        MOV     PARTO,A
;
        MOV     A,#0BFH
        MOVC    A,@A+DPTR
        CLR     C
        SUBB    A,PARTO
        MOV     PARTO,A
;
        MOV     A,STEMP
        CLR     C
        SUBB    A,PARTO
        MOV     STEMP,A
```

TTPOS:

;**********************************************************
;

;       START ONE SECOND FLOW CALCULATIONS
;
;$$$$$$$$$$$$$$$$$$$$$$$$$$$$$$$$$$$$$$$$$$$$$$$$$$$$$$$$$$$$$$$$

FLOWCALC:
        ;DO FLOW PERIOD CALCULATIONS

; DIVIDE TOTAL PULSE WIDTH COUNT SUM (NOW IN 'QUOT') BY
        ; NUMBER OF PULSES, TO GET AVERAGE PULSE WIDTH COUNT
;
; SHIFT DIVIDEND/QUOTIENT LEFT ONE BIT INTO PARTIAL DIVIDEND WHICH
; HAS BEEN SHIFTED ONE BIT LEFT WITH THE DIVIDEND AS ONE LONG, EN
; TO-END SHIFT REGISTER.
;
; SUBTRACT DIVISOR FROM PARTIAL DIVIDEND ONE BYTE AT A TIME STARTI
; WITH LOWER BYTE. SAVE RESULTS IN TEMPORARY REGISTER
;
; IF RESULT IS NEGATIVE, DIVISOR CAN NOT BE DIVIDED INTO PARTIAL
; DIVIDEND SO FORGET SUBTRACTION RESULTS, BUT DECREMENT BIT COUNTE
; AND LEAVE A ZERO IN THE LOW ORDER BIT POSITION OF THE QUOTIENT(I
; ALSO IS DIVIDEND). GO TO 'LOOP:' LOOP UNTIL 32 BITS SHIFTED.
;
; IF RESULT IS POSITIVE, DIVISOR CAN BE DIVIDED

;CLEAR PARTIAL DIVIDEND

CLR     A
        MOV     PART0,A
        MOV     PART1,A
        MOV     PART2,A
        MOV     PART3,A
        MOV     PART4,A
        MOR     BITC,#40        ;LOAD 'BIT COUNT' WITH 32

DIVLOOP:
        ;SHIFT DIVIDEN/QUOTIENT (i.e. SUM) LEFT ONE BIT INTO
        ;PARTIAL DIVIDEND (i.e. PART)

MOV     A,QUOT0
        CLR     C
        RLC     A
        MOV     QUOT0,A
        ;
        MOV     A,QUOT1
        RLC     A
        MOV     QUOT1,A
        ;
        MOV     A,QUOT2
        RLC     A
        MOV     QUOT2,A
        ;
        MOV     A,QUOT3
        RLC     A
        MOV     QUOT3,A
        ;
        MOV     A,QUOT4
        RLC     A
        MOV     QUOT4,A
        ;
        MOV     A,PART1
        RLC     A
        MOV     PART1,A
        ;
        MOV     A,PART2
        RLC     A
        MOV     PART2,A
        ;
        MOV     A,PART3
        RLC     A
        MOV     PART3,A
        ;
        MOV     A,PART4

```
            RLC     A
            MOV     PART4,A
;
; TEST SUBTRACTION OF DIVISOR FROM PARTIAL DIVIDEND
; IF RESULTS OF THE SUBTRACTION IS POSITIVE i.e. THE DIVISOR IS
; SMALLER THAN OR EQUAL TO THE PARTIAL DIVIDEND, THEN THE RESULTS
; OF THE SUBTRACTION IS TRANSFERED TO THE PARTIAL DIVIDEND AND THE
; QUOTIENT IS INCREMENTED BY ONE.

MOV     A,PART0
            CLR     C
            SUBB    A,SFEDGL
            MOV     TEST0,A
            MOV     A,PART1
            SUBB    A,SFEDGH
            MOV     TEST1,A
            MOV     A,PART2
            SUBB    A,#0
            MOV     TEST2,A
            MOV     A,PART3
            SUBB    A,#0
            MOV     TEST3,A
            MOV     A,PART4
            SUBB    A,#0
            MOV     TEST4,A

; IF CARRY IS SET THEN DIVISOR (FEDG i.e. NUMBER OF FLOW PULSES
; PER PERIOD) IS LARGER THAN THE PARTIAL DIVIDEND, THEREFORE, THE DI
; SUBTRACTION IS IGNORED.  IF CARRY IS CLEAR, THEN THE DIVISOR CAN
; DIVIDED INTO THE DIVIDEND ONE TIME, SO THE DIVISOR IS SUBTRACTED
; THE PARTIAL DIVIDEND (i.e. MOVE RESULTS IN "TEST" TO "PART") AND
; THE LSB OF THE QUOTIENT IS SET.

JC      DIVDEC

;CARRY NOT SET SO TRANSFER "TEST" TO "PART" AND SET
            ;LSB OF QUOTIENT

MOV     PART0,TEST0
            MOV     PART1,TEST1
            MOV     PART2,TEST2
            ;CARRY IS SET SO DIVISOR CAN NOT BE DIVIDED INTO DIVIDEND
            ;THEREFORE, DECREMENT THE BIT COUNTER AND LOOP IF NOT ZERO

DJNZ    BITC,DIVLOOP

TENDIV:
            ;DIVIDE AVERAGE PULSE WIDTH (i.e. TOTAL PULSE WIDTH SUM DI
            ;BY TOTAL NUMBER OF FLOW EDGES IN A ONE SECOND PERIOD) INT
            ;TEN MILLION TO GET GALLONS PER HOUR TIMES 100 OUTPUT FROM
            ;FLOW METER.

;CLEAR PARTIAL DIVIDEND

CLR     A
            MOV     PART0,A
            MOV     PART1,A
            MOV     PART2,A
            MOV     PART3,A
            MOV     PART4,A
            MOV     BITC,#40        ;LOAD "BIT COUNT" WITH 40

;LOAD NEW DIVIDEND/QUOTIENT(i.e. TEN) WITH 221,184,000,000

MOV     TEN0,#00H
            MOV     TEN1,#0
            MOV     TEN2,#98H
            MOV     TEN3,#7FH
            MOV     TEN4,#33H

TENLOOP:
```

;SHIFT DIVIDEND/QUOTIENT (i.e. TEN ) LEFT ONE BIT INTO
;PARTIAL DIVIDEND (i.e. PART ).

```
MOV     A,TEN0
CLR     C
RLC     A
MOV     TEN0,A
;
MOV     A,TEN1
RLC     A
MOV     TEN1,A
;
MOV     A,TEN2
RLC     A
MOV     TEN2,A
;
MOV     TEN3,A
;
MOV     A,TEN4
RLC     A
MOV     TEN4,A
;
MOV     A,PART0
RLC     A
MOV     PART0,A
;
MOV     A,PART1
RLC     A
MOV     PART1,A
;
MOV     A,PART2
RLC     A
MOV     PART2,A
;
MOV     A,PART3
RLC     A
MOV     PART3,A
;
MOV     A,PART4
RLC     A
MOV     PART4,A
```

;TEST SUBTRACTION

```
MOV     A,PART0
CLR     C
SUBB    A,QUOT0
MOV     TEST0,A
MOV     A,PART1
SUBB    A,QUOT1
MOV     TEST1,A
MOV     A,PART2
SUBB    A,QUOT2
MOV     TEST2,A
MOV     A,PART3
SUBB    A,QUOT3
MOV     TEST3,A
MOV     A,PART4
SUBB    A,QUOT4
MOV     TEST4,A
```

;IF CARRY CLEAR THEN DIVIDEND CAN BE DIVIDED BY DIVISOR.

```
JC      TENDEC
```

;CARRY NOT SET, SO TRANSFER "TEST" TO "PART" AND
;SET LSB OF QUOTIENT (i.e. TEN ).

```
MOV     PART0,TEST0
MOV     PART1,TEST1
MOV     PART2,TEST2
MOV     PART3,TEST3
MOV     TEN0,A
```

TENDEC:

;CARRY IS SET, SO DIVIDEND CAN NOT BE DIVIDED BY DIVISOR.

DJBZ   BITC,TENLOOP

;UPDATE TO TRANSMIT

;*********************************************************
;
;       FOUR SECOND MOVING AVERAGE OF FLOW
;
;*********************************************************

MOVE:

```
        MOV     PART3,#0
;
        MOV     A,FLOWLO
        ADD     A,FLOWL1
        MOV     PART0,A
;
        MOV     A,FLOWHO
        ADDC    A,FLOWH1
        MOV     PART1,A
;
        MOV     A,FLOWHO
        ADDC    A,FLOWH1
        MOV     PART2,A
;
        CLR     A
        ADDC    A,PART3
        MOV     PART3,A
;
;
;
        MOV     A,PART0
        ADD     A,FLOWL2
        MOV     PART0,A
;
        MOV     A,PART1
        ADDC    A,FLOWH2
        MOV     PART1,A
;
        MOV     A,PART2
        ADDC    A,FLOWH2
        MOV     PART2,A
;
        CLR     A
        MOV     A,PART1
        ADDC    A,TEB1
        MOV     PART1,A
;
        MOV     A,PART2
        ADDC    A,TEN2
        MOV     PART2,A
;
        CLR     A
        ADDC    A,PART3
        MOV     PART3,A

; DIVIDE BY 4

MOV     A,PART3
        RRC     A
        MOV     PART3,A
;
        MOV     A,PART2
```

```
RRC     A
MOV     PART2,A
;
MOV     A,PART1
RRC     A
MOV     PART1,A
;
MOV     A,PART0
RRC     A
MOV     PART0,A
;
MOV     A,PART3
RRC     A
;
MOV     A,PART2
RRC     A
MOV     PART2,A
;
MOV     A,PART1
RRC     A
MOV     PART1,A
;
MOV     A,PART0
RRC     A
MOV     PART0,A
;
; UPDATE

MOV     FLOWL0,FLOWL1
MOV     FLOWM0,FLOWM1
MOV     FLOWH0,FLOWH1
MOV     FLOWM2,TEN2
;
MOV     STESTL,PART0
MOV     STESTH,PART1
MOV     XSTAT,PART2
;
; UPDATE FOR 8 SECOND AVERAGE

;
MOV     FLOWL3,FLOWL4
MOV     FLOWM3,FLOWM4
MOV     FLOWH3,FLOWH4
;
MOV     FLOWL4,PART0
MOV     FLOWM4,PART1
MOV     BLOWH4,PART2
;
; SUM FOR 8 SECOND AVERAGE
;
MOV     A,FLOWL3
ADD     A,FLOWL4
MOV     PART0,A
;
MOV     A,FLOWM3
ADDC    A,FLOWM4
MOV     PART1,A
;
MOV     A,FLOWH3
ADDC    A,FLOWH4
;
; DIVIDE BY TWO
;
RRC     A
MOV     PART2,A
;
MOV     A,PART1
RRC     A
MOV     PART1,A
;
MOV     A,PART0
RRC     A
MOV     PART0,A
;
```

```
        MOV     SFLOWL,PART0
        MOV     SFLOWM,PART1
        MOV     SFLOWH,PART2

;**********************************************************
;
;       TEMPERATURE VOLUME CORRECTED TO 60 DEGREES F = 16 DEGREES
;       ...TEMPERATURE DIFFERENCE BETWEEN CURRENT TEMPERAT
;       AND 60 DEGREES 'F' AND STORE IN QUOT2 (i.e. QUOT2=10H-STE
;       NOTE: 60 DEGREES 'F' = 15.55 DEGREES 'C'.

MOV     A,#16
        CLR     C
        SUBB    A,STEMP
        MOV     QUOT2,A
        CLR     NEGF

;TEST FOR NEGATIVE CORRECTION FACTOR

JNB     ACC.7,TPOS

;RESULTS IS NEGATIVE

SETB    NEGF
        CLR     C
        MOV     A,#0
        SUBB    A,QUOT2
        MOV     QUOT2,A

TPOS:

;MULTIPLY TEMPERATURE DIFFERENCE TIMES 8091

MOV     A,#09BH         ;LOWER BYTE OF 8091
        MOV     B,QUOT2
        MUL     AB
        MOV     QUOT0,A
        MOV     QUOT1,B
        MOV     A,#01FH         ;UPPER BYTE OF 8091
        MOV     B,QUOT2
        MUL     AB
        ADD     A,QUOT1
        MOV     QUOT1,A
        MOV     A,#0
        ADDC    A,B
        MOV     QUOT2,A

;********* MULTIPLY FLOW TIMES CORRECTION FRACTION *********:

MOV     TEST5,#0
        MOV     TEST4,#0
        MOV     TEST3,#0
        MOV     BITC,#24

TNXTBT:

;ROTATE MULTIPLIER i.e. CORRECTION FACTOR - DELTA

MOV     A,QUOT2
        CLR     C
        RRC     A

;
        JNC     TROTATE

;ADD MULTIPLICAND i.e. FLOW RATE TO THE THREE MOST SIGNIFI
;BYTES OF PARTIAL PRODUCT i.e. TEST5,TEST4,TEST3

MOV     A,TEST3
        ADD     A,SFLOWL
        MOV     TEST3,A
        ;
```

```
            MOV     A,TEST4
            ADDC    A,SFLOWH
            MOV     TEST4,A
            ;
            MOV     A,TEST5
            ADDC    A,SFLOWH
            MOV     TEST5,A

TROTATE:

MOV     A,TEST5
            CLR     C
            RRC     A
            MOV     TEST5,A
            ;
            MOV     A,TEST4
            RRC     A
            MOV     TEST4,A
            ;
            MOV     A,TEST3
            RRC     A
            MOV     TEST3,A
            ;
            MOV     A,TEST2
            RRC     A
            MOV     TEST2,A
            ;
            MOV     A,TEST1
            RRC     A
            MOV     TEST1,A
            ;
            MOV     A,TEST0
            RRC     A
            MOV     TEST0,A
            ;
            DJNZ    BITC,TNXTBT

MOV     TMUL5,TEST5
            MOV     TMUL4,TEST4
TDIV:

;DIVIDE RESULTS BY 10000000  THIS LEAVES FLOW CORRECTION
            ;IN GALLON PER HOUR TIMES 100.
            ;10000000 = 989680H

;CLEAR PARTIAL DIVIDEND

CLR     A
            MOV     PART0,A
            MOV     PART1,A
            MOV     PART2,A
            MOV     PART3,A
            MOV     PART4,A
            MOV     PART5,A
            MOV     BITC,#48        ;LOAD 'BIT COUNT' WITH 48

;LOAD NEW DIVIDEND/QUOTIENT(i.e. TEN) WITH 10000000 DECIMAL

MOV     TEN0,#80H
            MOV     TEN1,#96H
            MOV     TEN2,#98H

TLOOP:

;SHIFT DIVIDEND/QUOTIENT (i.e. TEN) LEFT ONE BIT INTO
            ;PARTIAL DIVIDEND (i.e. PART).

MOV     A,TMUL0
            CLR     C
            RLC     A
            MOV     TMUL0,A
            ;
            MOV     A,TMUL1
```

```
       RLC     A
       MOV     TMUL1,A
       ;
       MOV     A,TMUL2
       RLC     A
       MOV     TMUL2,A
       ;
       MOV     A,TMUL3
       RLC     A
       MOV     TMUL3,A
       ;
       MOV     A,TMUL4
       RLC     A
       MOV     TMUL4,A
       ;
       MOV     A,TMUL5
       MOV     A,PART1
       RLC     A
       MOV     PART1,A
       ;
       MOV     A,PART2
       RLC     A
       MOV     PART2,A
       ;
       MOV     A,PART3
       RLC     A
       MOV     PART3,A
       ;
       MOV     A,PART4
       RLC     A
       MOV     PART4,A
       ;
       MOV     A,PART5
       RLC     A
       MOV     PART5,A

;TEST SUBTRACTION

MOV     A,PART0
       CLR     C
       SUBB    A,TEN0
       MOV     TEST0,A
       ;
       MOV     A,PART1
       SUBB    A,TEN1
       MOV     TEST1,A
       ;
       MOV     A,PART2
       SUBB    A,TEN2
       MOV     TEST2,A
       ;
       MOV     A,PART3
       SUBB    A,#0
       MOV     TEST3,A
       ;
       MOV     A,PART4
       SUBB    A,#0
       MOV     TEST4,A
       ;
       MOV     A,PART5
       SUBB    A,#0
       MOV     TEST5,A
       ;IF CARRY CLEAR THEN DIVIDEND CAN BE DIVIDED BY DIVISOR

JC      TDEC
       MOV     PART5,TEST5
       ;
       MOV     A,TMUL0
       ADD     A,#1
       MOV     TMUL0,A

TDEC:
```

;CARRY IS SET, SO DIVIDEND CAN NOT BE DIVIDED BY DIVISOR

```
        DJNZ    BITC,TLOOP

MOV     QUOT0,TMUL0
        MOV     QUOT1,TMUL1
        MOV     QUOT2,TMUL2
```

;CORRECT FLOW VOLUME TO 60 F = 16 C.

;CHECK TO SEE IF DELTA VOLUME IS TO BE ADDED OR SUBTRACTED

```
        JNB     NEGF,ADDVOL
```

;CORRECTION VOLUME IS TO BE SUBTRACTED FROM GALLONS PER HO(

```
        MOV     A,#0
        CLR     C
        SUBB    A,QUOT0
        MOV     QUOT0,A
        ;
        MOV     A,#0
        SUBB    A,QUOT1
        MOV     QUOT1,A
        ;
        MOV     A,#0
        SUBB    A,QUOT2
        MOV     QUOT2,A

ADDVOL:
```

;ADD CORRECTION VOLUME TO FLOW RATE

```
        MOV     A,SFLOWL
        ADD     A,QUOT0
        MOV     SFLOWL,A
        ;
        MOV     A,SFLOWH
        ADDC    A,QUOT1
        MOV     SFLOWH,A
        ;

ANL     P1,#0BFH        ;P1 6 CLEAR
        JMP     MAINL
```

;**************************************************************
;
;       INTERRUPT ZERO ) USED FOR FLOW PULSE INPUTS
;
;**************************************************************

```
INT00:
        MOV     FRCTRT,FRCTR
        MOV     FRCTR,#0
        MOV     FRAMET,FRAME
        PUSH    PSW
        PUSH    ACC
```

;READ CURRENT TICK TIME

```
RELOAD:
        MOV     NEWH,TH0
        MOV     NEWL,TL0
        MOV     A,TH0
        CJNE    A,NEWH,RELOAD

CLR     PX0             ;REDUCE PRIORITY
        SETB    P1.7
```

;ADD ONE TO FLOW EDGE COUNT

```
        MOV     A,FEDGL
```

```
            ADD     A,#1
            MOV     FEDGL,A
            CLR     A
            ADDC    A,FEDGH
            MOV     FEDGH,A
TJMP:
            ;CALCULATE FLOW PULSE WIDTH

MOV     A,FRCTRT
            CJNE    A,#0,T123
T00:
            ;BOTH EDGES IN SAME FRAME
            MOV     A,NEWL
            CLR     C
            SUBB    A,OLDL
            MOV     PWL,A
            MOV     A,NEWH
            SUBB    A,OLDH
            MOV     PWH,A

MOV     A,FRAMET
            CJNE    A,#0AH,T11
T2:
            JMP     UPDATE

T11:
            ;TAKE 2'S COMPLEMENT OF OLD TIME

MOV     A,OLDL
            CPL     A
            ADD     A,#1
            MOV     OLDL,A
            MOV     A,OLDH
            CPL     A
            ADDC    A,#0
            MOV     OLDH,A

;ADD OLD TIME TO NEW TIME

MOV     A,OLDL
            ADD     A,NEWL
            MOV     PWL,A
            MOV     A,OLDH
            ADDC    A,NEWH
            MOV     PWH,A
;           MOV     STESTL,PWL
;           MOV     STESTH,PWH
            JMP     UPDATE
TX:
            CJNE    A,#2,OVERFLOW
            MOV     A,FRAMET
            CJNE    A,#9,OVERFLOW
T3:
            JMP     UPDATE
OVERFLOW:
            SETB    OFLOWF          ;PULSE WIDTH TO BIG TO HANDEL
            JMP     UPDATE
UPDATE:
            MOV     OLDL,NEWL
            MOV     OLDH,NEWH

;************************************************************
;
;       CALCULATE CORRECTED PULSE WIDTH
;
;************************************************************

;GET HIGH AND LOW BYTES OF EXTENDED "K"
            ;CALTAB FORMAT
```

```
        RR      A
        ANL     A,07
        ADD     A,DPH
        MOV     DPH,A
        ;
        MOV     A,PWL
        SWAP    A
        RR      A
        ANL     A,06
        MOV     KL,A
        ;
        MOV     A,PWH
        RL      A
        RL      A
        RL      A
        ANL     A,00F8H
        ADD     A,KL
        ;
        ADD     A,DPL
        ANL     A,00FEH
        MOV     DPL,A
        CLR     A
        ADDC    A,DPH
        MOV     DPH,A
        ;
        CLR     A
        MOVC    A,@A+DPTR
        MOV     KL,A
        MOV     A,01
        MOVC    A,@A+DPTR
        MOV     KH,A
        ;
        ;MULTIPLY SLOPE*PULSE WIDTH

SLOPE:
        MOV     MULR3,00
        MOV     MULR2,00
        MOV     MULCTR,016

NXTBT:
        ;ROTATE MULTIPLIER i.e. SLOPE RIGHT INTO CARRY

MOV     A,KH
        CLR     C
        RRC     A
        MOV     KH,A
        MOV     A,KL
        RRC     A
        MOV     KL,A
        ADD     A,PWL
        MOV     MULR2,A
        MOV     A,MULR3
        ADDC    A,PWH
        MOV     MULR3,A

ROTATE:
        MOV     A,MULR3
        CLR     C
        RRC     A
        MOV     MULR3,A
        ;
        MOV     A,MULR2
        RRC     A
        MOV     MULR2,A
        ;
        MOV     A,MULR1
        RRC     A
        MOV     MULR1,A
        ;
        MOV     A,MULR0
```

```
        RRC     A
        MOV     MULRO,A
        ;
        DJNZ    MULCTR,NXTBT

;ADD SLOPE*(PULSE WIDTH) TO TOTAL PERIOD COUNT

MOV     A,SUM0
        ADD     A,MULR0
        MOV     SUM0,A
        MOV     A,SUM1
        ADDC    A,MULR1
        MOV     SUM1,A
        MOV     A,SUM2
        ADDC    A,MULR2
        MOV     SUM2,A
        MOV     A,SUM3
        ADDC    A,MULR3
        MOV     SUM3,A
        CLR     A
        ADDC    A,SUM4
        MOV     SUM4,A

; EXIT

CLR     P1.7
        SETB    PX0                     ;RESTORE PRIORITY
        POP     ACC
TIME0:
        PUSH    PSW
        PUSH    ACC
        XRL     P1,#4                   ;P1.2
        INC     FRCTR                   ;INC FRAME COUNTER EACH TIMER0 CYCL
        DJNZ    FRAME,SECD
        MOV     TL0,#SHORTL             ;LOW BYTE OF SHORT CYCLE TIMER VAL
        MOV     TH0,#SHORTH             ;HIGH BYTE OF SHORT CYCLE TIMER VA
        MOV     FRAME,#0AH
        XRL     P1,#2                   ;LOOK AT P1.1 WITH SCOPE AND DIGIT
                                        ;ADJUST SHORT TIMER VALUE FOR EXAC
                                        ;SECOND PERIOD
        SETB    SECF                    ;SET ONE SECOND FLAG

CLR     SPDF
        JNB     PERF,J1
        SETB    SPDF
J1:
        SETB    PERF                    ;SET PERIOD FLAG TO START CALCULAT

;UPDATE XMIT DATA

SETB    NEWVALF
        ANL     STATUS,#07EH
        MOV     XTEMP,STEMP
        MOV     XFEDGL,SFEDGL
        MOV     XFEDGH,SFEDGH
        MOV     XFLOWL,SFLOWL
        MOV     XFLOWM,SFLOWM
        MOV     XFLOWH,SFLOWH
        MOV     XTESTL,STESTL
        MOV     XTESTH,STESTH

;TEMP PERIOD UPDATES

MOV     STEDGL,TEDGL
        MOV     STEDGH,TEDGH
        MOV     TEDGL,#0
        MOV     TEDGH,#0

;FLOW PERIOD UPDATES

MOV     QUOT0,SUM0
```

```
        MOV     QUOT1,SUM1
        MOV     QUOT2,SUM2
        MOV     QUOT3,SUM3
        MOV     QUOT4,SUM4
        MOV     FEDGL,#0
        MOV     FEDGH,#0

SECD:
        POP     ACC
        POP     PSW
        RETI

;************************************************************
;
;       FLOW METER CALIBRATION DATA
;
;************************************************************
        CRG     0A100H

;************************************************************
;
; CALIBRATION TABLE FORMAT
;
;       EXTENDED "K" LOW BYTE
;       EXTENDED "K" HIGH BYTE
;
;************************************************************

CALTAB:

;************ END OF CALIBRATION TABLE ************

;************************************************************
;
;       TEMPERATURE LOOK UP TABLE
;
;************************************************************
        ORG     0AF00H

TTAMP:

;********** END OF TEMPERATURE TABLE **********
        PAGE
        END
        PAGE
BOT:
```

Although the present invention has been described in detail, the same is by illustration and example only and is not to be taken by way of limitation, the spirit and scope of the invention being limited only by the terms of the appended claims.

We claim:

1. A flowmeter for measuring the flow rate of a fluid in a fluid path, comprising:

a look-up table having a plurality of addressable storage locations therein, each of the addressable storage locations including a predetermined flow rate value stored therein equal to a predetermined number of pulses per unit volume of the fluid at a given flow rate;

means for generating a pulse signal having a plurality of pulses, each of the pulses having a pulse width proportional to instantaneous flow rate of the fluid;

control means for receiving the pulse signal and in response thereto determining the pulse width of each pulse therein and for generating a pulse width count in clock cycles proportional to the pulse width of each pulse;

means responsive to each pulse width count in clock cycles for directly selecting one of the plurality of addressable storage locations in the look-up table;

means for retrieving the predetermined flow rate value from the selected addressable storage location; and means for averaging one or more flow rate values retrieved from the selected addressable storage locations over a predetermined time period to generate a flow rate signal from the stored flow rate values instead of the pulse signal.

2. The flowmeter as described in claim 1 further including:

means for sensing ambient temperature of the fluid and in response thereto generating a control signal proportional to the ambient temperature.

3. The flowmeter as described in claim 2 wherein the control means further includes means for receiving the control signal and the flow rate signal and in response thereto generating a temperature-corrected flow rate signal.

4. A flowmeter for measuring the flow rate of fuel in a fuel path, comprising:
  storage means having a plurality of addressable storage locations, each of the storage locations including a predetermined flow rate value stored therein equal to a predetermined number of pulses per unit volume of the fluid at a given flow rate;
  means for generating a pulse signal having a plurality of pulses, each of the pulses having a pulse width proportional to instantaneous flow rate of the fluid;
  means for receiving the pulse signal and in response thereto determining the pulse width of pulses therein and for generating a pulse width count in clock cycles proportional to the pulse width of each pulse for which a pulse width determination is made;
  means responsive to each pulse width count in clock cycles for directly selecting one of the plurality of addressable storage locations in the look-up table;
  means for retrieving the predetermined flow rate value from the addressable storage location to generate an estimate of the instantaneous flow rate for each pulse of the pulse signal;
  means for averaging the flow rate estimates over a predetermined period of time to generate a flow rate signal from the stored flow rate values instead of the pulse signal;
  means for sensing ambient temperature and generating a control signal proportional thereto; and
  means for receiving the flow rate signal and the control signal and in response thereto generating a temperature-corrected flow rate signal.

5. A flow monitoring system for measuring the flow rate of fuel in a fuel path between an engine and a fuel tank, comprising:
  a flowmeter located in the fuel path and comprising:
  means for generating a pulse signal having a plurality of pulses, each of the pulses having a pulse width proportional to instantaneous flow rate of the fuel; and
  means for processing the pulse signal to determine the flow rate of the fuel in the fuel path;
  a flow monitor connected to the flowmeter for displaying the flow rate of the fuel in the fuel path; and
  accumulator means located between the flowmeter and the engine for dampening pressure pulses in the fuel path.

6. The flow monitoring system as described in claim 5 wherein the means for processing of the flowmeter comprises:
  a look-up table having a plurality of addressable storage locations each including a predetermined flow rate value stored therein, the predetermined flow rate value equal to a predetermined number of pulses per unit volume of fuel at a given flow rate; and
  control means for receiving the pulse signal and in response thereto determining the pulse width of each pulse therein.

7. The flow monitoring system as described in claim 6 wherein the control means of the processing means further includes:
  means responsive to each pulse width determination for selecting one of the plurality of addressable storage locations in the look-up table;
  means for retrieving a predetermined flow rate value from the addressable storage location for each pulse of the pulse signal; and
  means for averaging the flow rate values over a predetermined time period to calculate a flow rate signal.

* * * * *